United States Patent
Begeja et al.

(10) Patent No.: US 8,051,134 B1
(45) Date of Patent: Nov. 1, 2011

(54) SYSTEMS, METHODS, AND PROGRAMS FOR EVALUATING AUDIO MESSAGES

(75) Inventors: Lee Begeja, Gillette, NJ (US);
Narendra K Gupta, Dayton, NJ (US);
Benjamin J Stern, Morris Township, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1052 days.

(21) Appl. No.: 11/312,475

(22) Filed: Dec. 21, 2005

(51) Int. Cl.
*G06F 15/16* (2006.01)
(52) U.S. Cl. ...................................... 709/206
(58) Field of Classification Search .............. 709/204, 709/206
See application file for complete search history.

(56) References Cited

U.S. PATENT DOCUMENTS

| | | | |
|---|---|---|---|
| 6,161,130 A | 12/2000 | Horvitz et al. | |
| 2004/0037397 A1* | 2/2004 | Roby | 379/88.01 |
| 2005/0041789 A1* | 2/2005 | Warren-Smith et al. | 379/93.24 |
| 2007/0128899 A1* | 6/2007 | Mayer | 439/152 |
| 2008/0194241 A1* | 8/2008 | Kretz | 455/417 |

* cited by examiner

*Primary Examiner* — Wing Chan
*Assistant Examiner* — Andrew Woo

(57) ABSTRACT

Systems, methods, and programs, for evaluating audio messages store a model that may include language patterns, audio patterns, and/or metafeatures that indicate a likelihood that the audio message is a spam message or a non-spam message and compare the content of the input audio message with the model. Based on the comparison, the systems, methods, and programs identify the input audio message as a spam message or a non-spam message.

12 Claims, 3 Drawing Sheets

SYSTEMS, METHODS, AND PROGRAMS FOR EVALUATING AUDIO MESSAGES

BACKGROUND

The term "spam" is a coined word for unwanted messages especially in digital communications such as e-mails. To detect spam, conventional Bayesian-type e-mail detection systems compare new e-mail messages with language models. The language models are developed by evaluating the text of e-mail messages that are known to be spam and extracting language patterns from the spam messages. The systems then estimate the probably that new e-mail messages are spam based on the frequency with which language patterns from the language models appear in the new e-mail message. Such a system is described, for example, in U.S. Pat. No. 6,161,130.

Such unwanted "spam," however, may also occur in audio messages such as, for example, voicemail.

SUMMARY

Voicemail spam, for example, large-scale telephone solicitation from telemarketers, has increased in recent years. While Caller ID® may be relied on by voicemail systems, to screen incoming calls in order to avoid telemarketers, the advent of VoIP (Voice over Internet Protocol) has caused the amount of spam voicemail to increase in spite of these systems because VoIP allows a caller to falsify, mask, or hide their actual originating telephone number.

Furthermore, in order to avoid conventional text-based e-mail spam filters e-mail spammers have resorted to attaching spam audio files to nondescript e-mails. Because conventional e-mail filters are unable to evaluate the content of such audio messages, these e-mails are not detected as spam.

Audio message systems, methods, and programs are disclosed that may evaluate and categorize saved voicemail messages based on the content of the audio messages. The audio message systems, methods, and programs may evaluate and categorize the language patterns within a message. The audio message systems, methods, and programs may evaluate and categorize the audio patterns within a message. The audio message systems, methods, and programs may evaluate and categorize metafeatures associated with a message.

The audio message systems, methods, and programs may store a model that may include language patterns, audio patterns, and/or metafeatures that indicate a likelihood that the audio message is a spam message or a non-spam message and may compare the content of the input audio message with the model. Based on the comparison, the systems, methods, and programs may identify the input audio message as a spam message or a non-spam message.

DETAILED DESCRIPTION OF EMBODIMENTS

Figure 1:
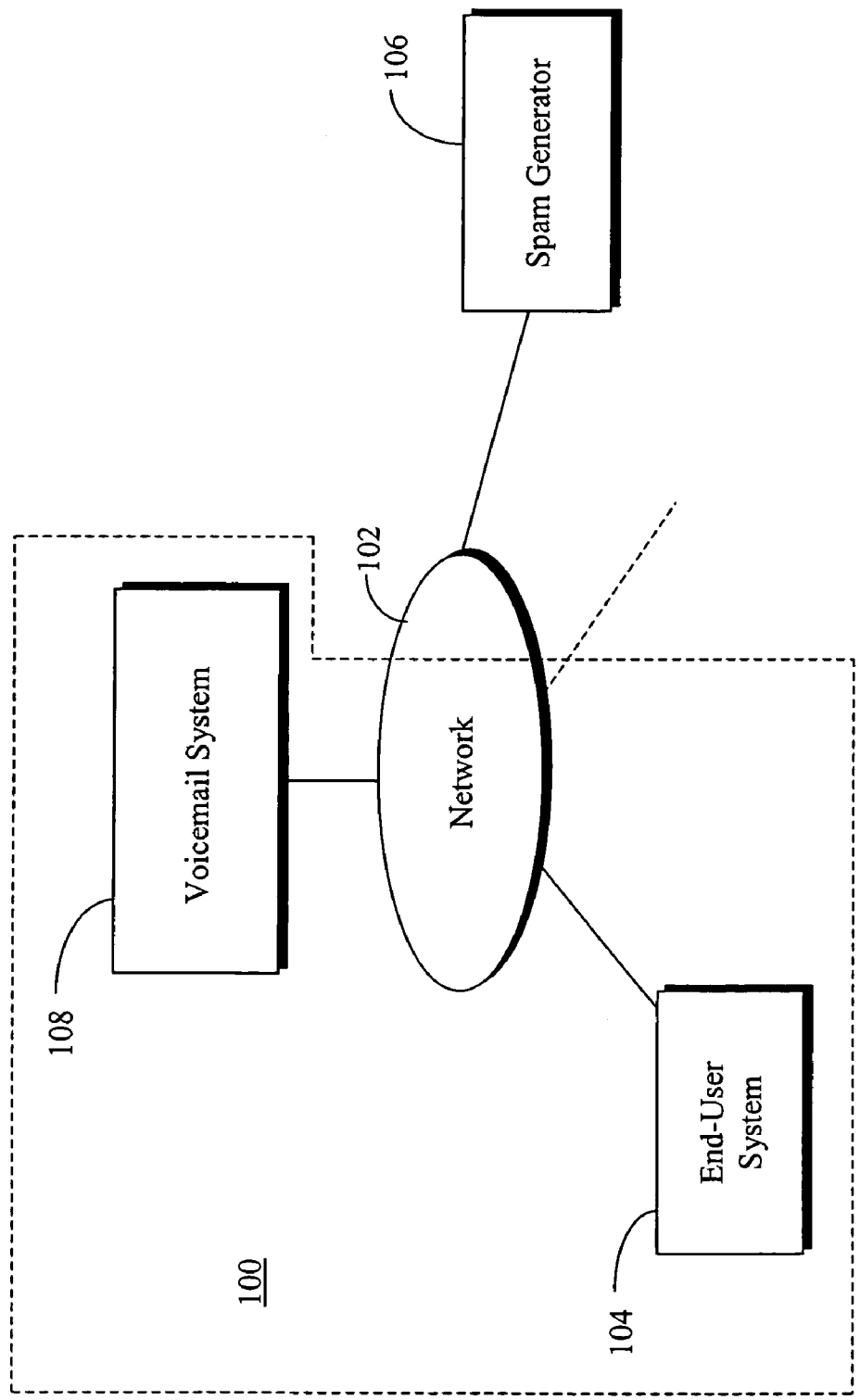
FIG. 1 shows an audio message system according to exemplary implementations of the principles described herein.

FIG. 1 shows an exemplary audio message system 100 usable to detect and/or filter audio spam. As shown in FIG. 1, the system 100 may include, for example, a voicemail system 108 and/or an end-user system 104 connected, for example, by a network 102. It should be appreciated that in the context of the following examples, the term "voicemail" is intended to encompass not only traditional voicemail systems, but any message sent in an audio form, including, for example, audio files attached to e-mail messages.

The end-user system 104, for example, may be a system or device by which a user may access audio messages. The end-user system 104 may include one or more of, for example, a wired telephone, wireless telephone, a VoIP device, a personal computer, a notebook computer, a client or server of a network, a personal digital assistant (PDA), and/or any other now known or later developed device capable of accessing audio messages.

The voicemail system 108, for example, may be a system or device that receives and stores voicemail messages. The voicemail system may include one or more of, for example, an answering machine, a personal computer, a notebook computer, a client or server of a network, a large scale dedicated voicemail system run by a service provider, and/or any other now known or later developed device capable of receiving and storing audio messages.

As shown in FIG. 1, the voicemail system 108 may be a separate system from the end-user system 104 and may be connected to the end-user system 104 by the network 102 such as, for example, a remote voicemail system located on a server operated by a telephone or audio message provider. However, instead of being connected over the network 102, the voicemail system 108 may be a separate system directly connected to the end-user system 104, for example, wired or wirelessly. Furthermore, the voicemail system 108 may be integrated into the end-user system 104 as part of a single system or a single device.

According to this example, the network functions to transmit voicemail messages between a sender, the voicemail system 108, and/or the end-user system 104. The network may include, for example, a wired or wireless network, such as, for example, one or more of a wired telephone network, a wireless telephone network, an intranet, an extranet, a local area network, a wide area network, a storage area network, and/or the Internet.

As shown in FIG. 1, only a portion of the network 102 may be included in the spam detection system 100. In particular, where the network is a telephone network or a large-scale computer network such as the Internet, only that portion of the network 102 that receives the voicemail message and transmits them to and/or between the voicemail system 108 and/or the end-user system 104 may be part of the system 100. Alternatively, where the voicemail system 108 and end-user system 104 are directly connected to one another or included in a single system or device, the network 102 need not be part of the system 102.

In operation, a voicemail directed to the end-user is sent, for example, across the network 102 to the voicemail system 108 and on to the end-user system. As discussed in detail below, the voicemail system 108 or end-user system 104 may evaluate the message to determine whether the voicemail message is spam sent from spam generator 106, for example. If the voicemail message is spam, it is identified as such and stored in at least one of the voicemail system 108 or end-user system 104 for review by the end-user. If the voicemail is not spam, it is identified as such and stored in at least one of the voicemail system 108 or end-user system 104 for review by the end-user. Accordingly, the end-user may identify the spam voicemail messages as such, prior to reviewing them.

Figure 2:
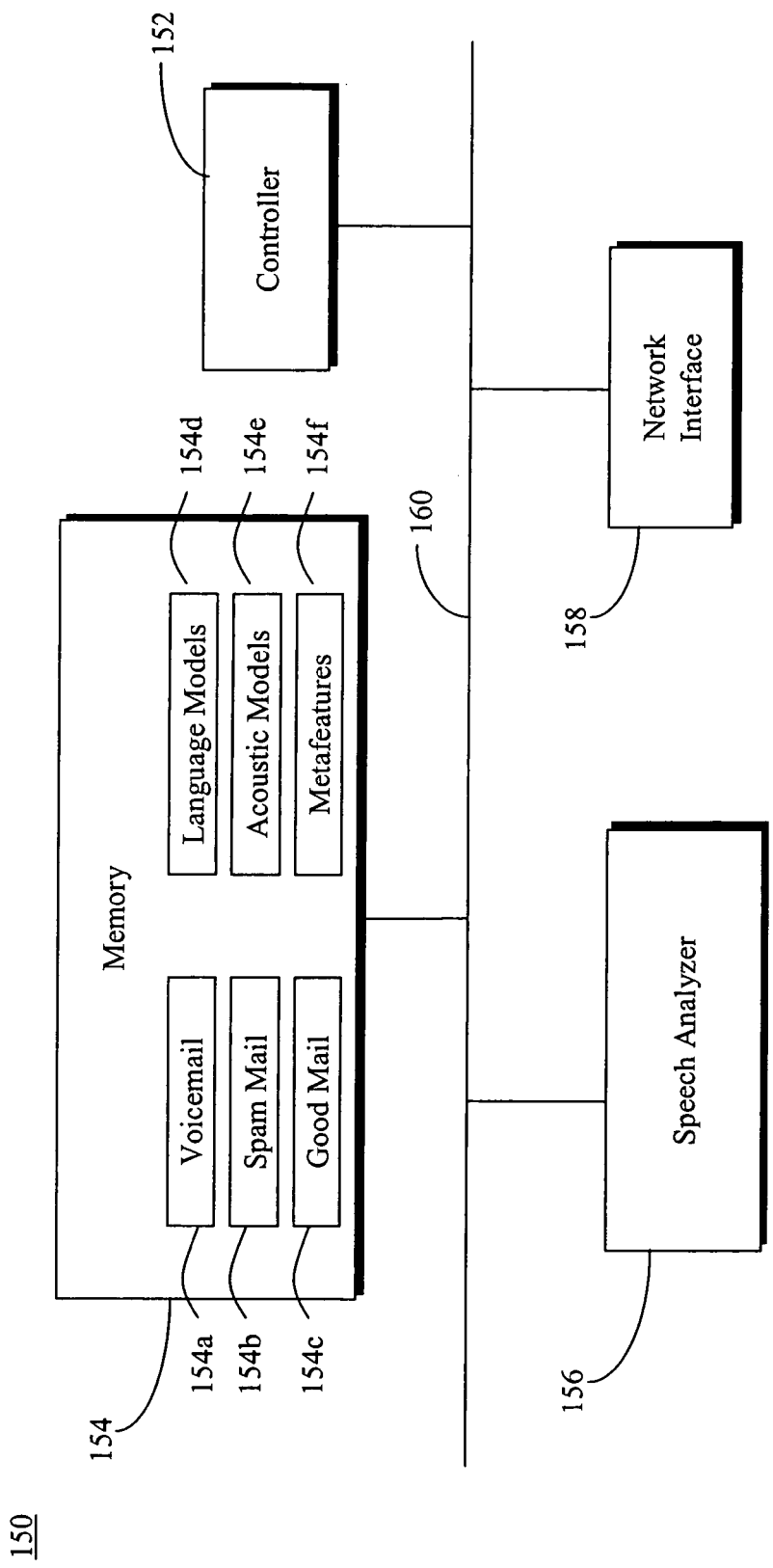
FIG. 2 shows an audio message classification system according to exemplary implementations of the principles described herein.

FIG. 2 shows a functional block diagram of an exemplary audio message classification system 150 for evaluating audio messages. As shown in FIG. 2, the audio message classification system 150 may physically, functionally, and/or conceptually include, for example, a controller 152, a memory 154, a speech analyzer 156 (that may be implemented as one or more of a circuit, routine, or application), and/or a network interface each, for example, appropriately interconnected by one or more data/control busses, application programming interfaces, and/or, wired or wireless network connections 160. The speech analyzer may include, for example, a speech recognition module that is loaded with various spam and/or non-spam models retrieved from the memory 154.

While FIG. 2 shows system 150 using bus architecture, any type of hardware architecture, including wired and wireless networks, may be used based on implementation details. For example, memory 154 and network interface 158 may be individually connected to controller 152. Also, these hardware components may be implemented using any available hardware technology such as FPGA, PAL, application specific integrated circuits (ASICs), etc.

As shown in FIG. 2 the memory may be physically, functionally, and/or conceptually divided into, for example, a voicemail portion 154a, a spam mail portion 154b, a good mail portion 154c, a language models portion 154d, an acoustic models portion 154e, and/or a metafeatures portion 154g, each of which may have, for example, a generic and personal component and/or a spam and non-spam component. The voicemail portion 154a may store, for example, incoming voicemails. The spam mail portion 154b may store, for example, voicemails that are likely spam. The good mail portion 154c may store, for example, voicemails that are likely not spam. The language models portion 154d may store, for example, language patterns that have been determined to frequently occur in spam messages or non-spam messages. The acoustic models portion 154e may store, for example, sound patterns that have been determined to frequently occur in spam messages. The metafeatures portion 154g may store one or more metafeatures that indicate spam messages or non-spam messages.

As used herein, the term "language patterns" is intended to encompass, for example, at least one or more representations of individual or sequences of alpha numeric characters, words, phrases, phonemes, syllables, and/or numbers. Each language pattern may have a score associated with it indicating, for example, a statistical likelihood that the pattern will be included in a spam message or a statistical likelihood that the pattern will be included in a non-spam message. For example, the language patterns may collectively form a model that is a stochastic Finite State Automata, representing n-gram sequences of phonemes or words with probabilities assigned to each transition. These language models are used by an Automatic Speech Recognition engine to guide the conversion of speech to text.

The term "audio patterns" is intended to encompass, for example, at least one or more representations of individual or sequences of characteristic and/or variations in, tone, pitch, speed, rhythm, pauses, inflection. Each audio pattern may have a score associated with it indicating, for example, a statistical likelihood that the pattern will be included in a spam message or a statistical likelihood that the pattern will be included in a non-spam message.

For example, such audio patterns might include, the mean and/or variance of speech energy characteristics, the detection of artificial voices, and/or the frequency, durations, mean, and/or variance of pauses within the message. In addition to, or instead of, the language patterns of message, the audio patterns within a message may help a system or method for evaluating audio messages to distinguish, for example, the practiced, often read or automated, voice characteristics of spam callers versus the more spontaneous and varied audio patterns of other callers. The use of audio patterns in addition to, or instead of, the language patterns of the messages may capture characteristics of speech not reflected by the word itself and may extend the usefulness of the system beyond only language models.

Additionally, for example, with respect to audio patterns, many large scale telemarketing centers automatically call a large amount of targeted telephone numbers at one time and do not connect a human telemarketer to the call unless it has been answered by a person or machine. As a result, there is a characteristic pause at the beginning of a message during which the telemarketing center is transferring the call to a human telemarketer. Such an initial pause may be included as part of an audio pattern indicating that a message may be spam.

"Metafeatures" are non-language, non-audio characteristics of a message that may help to determine whether or not the message is spam. Each metafeature may have a score associated with it indicating, for example, a statistical likelihood that the pattern will be included in a spam message or a statistical likelihood that the metafeature will be associated with a non-spam message. Metafeatures may include, for example, whether the caller's number or sender's e-mail address matches a particular number or address, or is blocked; the time of day that the message was received; a location from which the message was sent; whether the message is long-distance, local, or international; and/or an IP address of the sender.

It should be appreciated that generic portions of the language models portion 154d, acoustic models portion 154e, and/or metafeatures portion 154g may be developed and used system wide (i.e., on multiple users' voicemail messages) and may be monitored and updated automatically, for example, by evaluating messages that a plurality of users have tagged as spam or non-spam (e.g., using Bayesian techniques). Personal portions of the language models portion 154d, acoustic models portion 154e, and/or the metafeatures portion 154g may be developed and used only on a particular user's system and may be monitored and updated automatically by the user identifying voicemail classified as spam or non-spam (e.g., using Bayesian techniques). As the personal portion of the language models portion 154d, acoustic models portion 154e, and/or metafeatures portion 154g are improved (i.e., automatically updated by, for example, the associated user's voicemail habits and personal definition of spam) over a period of time, they may replace the generic portions as they become more tailored to the specific user.

As discussed above, each of the language models portion 154d, acoustic models portion 154e, and/or metafeatures portion 154g may be divided into, for example, spam portions and non-spam portions. The spam portions would include the respective language patterns, audio patterns, and metafeatures tending to indicate that a message is spam. Similarly, the non-spam portions would include the respective language patterns, audio patterns, and metafeatures tending to indicate that a message is non-spam.

The memory 154, shown in FIG. 2, can be implemented using any appropriate combination of alterable memory and/or non-alterable memory. The alterable memory, whether volatile or non-volatile, can be implemented using any one or more of static or dynamic RAM, a removable disk and disk drive, a writeable or re-writeable optical disk and disk drive, a hard drive, and/or flash memory. Similarly, the non-alterable or fixed memory can be implemented using any one or more of ROM, PROM, EPROM, EEPROM, and/or an optical ROM disk, such as CD-ROM or DVD-ROM disk.

The speech analyzer 156 may input a voicemail and determine one or more language pattern, audio pattern, and/or metafeatures associated with the voicemail. Then the speech analyzer 156 may access one or more of the language models portion 154d, acoustic models portion 154e, and/or metafeatures portion 154g. Based on the one or more language pattern, audio pattern, and/or metafeatures associated with the voicemail and the language patterns, audio patterns, and metafeatures stored in the language models portion 154d, acoustic models portion 154e, and metafeatures portion 154g, the speech analyzer 156 may determine the likelihood that the message is spam.

The network interface 158 may allow one or more or the elements of the system 150 to communicate with a network, such as for example, network 102.

In operation, an incoming voicemail may be input to the audio message classification system 150, for example via the network interface 158. Under control of the controller 152, the incoming voicemail may be stored in the voicemail portion 154a. Alternatively, under control of the controller 152, the incoming voicemail may be input directly into the speech analyzer 156.

Next, under control of the controller 152, the speech analyzer 156 may access the incoming voicemail message and extract features from the voice message using a speech recognizer with the language models. The features may be such things as the overall score of the recognition, the recognized string of words or phonemes, the N-best word and/or phoneme scores, the number of words or phonemes that have scores that pass some rejection threshold, and so on, The speech analyzer 156 may then extract features based on the audio patterns and metafeatures of the voicemail. Then, the speech analyzer 156 may access one or more of the language models portion 154d, acoustic models portion 154e, and/or metafeatures portion 154g. Based on the respective language patterns, audio patterns, and/or metafeatures stored in the language models portion 154d, acoustic models portion 154e, and metafeatures portion 154g, the speech analyzer 156 may determine the likelihood that the message is spam.

For example, each language pattern, audio pattern, and metafeature stored in the spam and non-spam portions of the respective language models portion 154d, acoustic models portion 154e, and metafeatures portion 154g may have a score (e.g., weight or probability) associated with it indicating the likelihood that that it occurs in a spam message or the likelihood that it occurs in a non-spam message. Thus, for each of the spam indicating language patterns, audio patterns, and metafeatures occurring in, or similar to those in, the voicemail, the scores for those language patterns, audio patterns, and metafeatures may be combined using a classification technique to obtain a spam probability score. Similarly, for each of the non-spam indicating language patterns, audio patterns, and metafeatures occurring in, or similar to those in, the voicemail, the scores for those language patterns, audio patterns, and metafeatures may be statistically combined using a classification technique to obtain a non-spam probability score. By comparing the ratio of the obtained scores, for example, to a predetermined threshold ratio, the speech analyzer 156 may determine whether the incoming voicemail is spam or non-spam.

If, as a result of the comparison, the incoming message is determined to be non-spam, under control of the controller 152, the incoming message may be stored in the good mail portion 154c. If, as a result of the comparison, the incoming message is determined to be spam, under control of the controller 152, the incoming message may be stored in the spam mail portion 154b. Accordingly, an incoming voicemail may be properly stored in either the good mail portion 154c or the spam mail portion 154b based on the content of the message.

Depending on cost or other design constraints, one or more of the above-described elements of the audio message classification system 150 may be combined into a single element or divided into multiple elements where appropriate. For example, although the exemplary audio message classification system 150 has been described as physically, functionally, and/or conceptually divided into a controller 154 and/or a speech analyzer 156, it should be appreciated that one or more circuits, routines, or applications making up the speech analyzer may be provided separately or included in and/or executed by the controller 152.

Although the exemplary audio message classification system 150 has been described as containing a memory 154, the system may contain multiple memories at separate locations. For example, the generic portions of the models 154d, 154e, 154f may be contained in a memory portion within and/or assigned to the speech analyzer 156.

Although the exemplary audio message classification system 150 may evaluate each incoming voicemail message as soon as it is received, it may store one or more incoming voicemail messages in the voicemail portion 154a until a predetermined number of messages is reached or until a predetermined evaluation period (e.g., every 15 minutes) has been reached.

According to the above example, the speech analyzer 156 determines whether a message is spam or non-spam based on how well portions of the message match, or are similar to, the language patterns, audio patterns, and metafeatures.

The audio message classification system 150 may be part of an end-user system (e.g., end-user system 104) or part of a centralized voicemail system (e.g., voicemail system 108). Furthermore, portions of the system may be part of an end-user system while other portions are part of a centralized voicemail system. For example, the speech analyzer 156, the generic model portion 154f, and/or the voicemail portion 154 may be part of a centralized voicemail system, having a controller and network interface; while the spam mail portion 154b, the good mail portion 154c, and the personal portions of the models 154d, 154e, 154f may be part of an end-user system, having a controller and network interface. Generally, the physical location of the elements of system 150 may be varied as long as the elements are operably connected.

Figure 3:
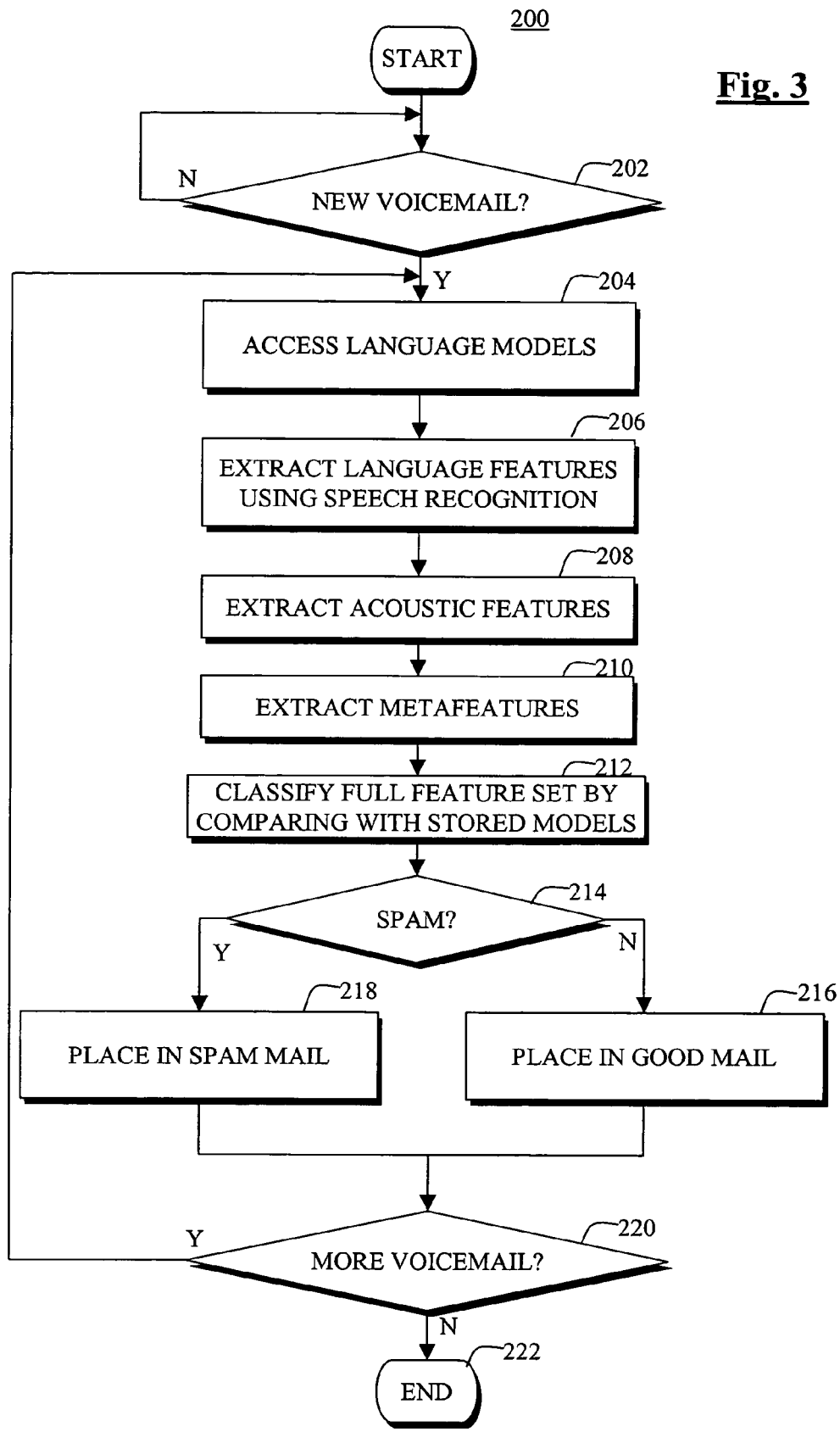
FIG. 3 shows a method for evaluating audio messages according to exemplary implementations of the principles described herein.

One example of an exemplary process 200 for evaluating audio messages is shown in FIG. 3. The exemplary process may be implemented, for example, by one or more components of the above-described audio message system 100 and/or audio message classification system 150. However, even though the exemplary structure of the above-described systems may be referenced in the description of the process, it should be appreciated that the referenced structure is exemplary and the exemplary process need not be limited by any of the above-described exemplary structure.

As shown in FIG. 3, in step 202 the process determines if there is an incoming voicemail to be analyzed. If the incoming voicemail is to be analyzed, the process continues to step 204. If there is not an incoming voicemail ready to be analyzed, operation returns to step 202. In step 204, stored language models are accessed. In step 206, the language features of the incoming voicemail are extracted using a speech recognition engine. In step 208, acoustic models are accessed and the acoustic features of the incoming voicemail are extracted.

Then, in step 210, any metafeature models are accessed and metafeature features associated with the incoming voicemail are extracted.

In step 212, the set of extracted features are classified using know classification techniques as spam and as non-spam. As discussed above, when classifying a set of extracted features it may be given a score indicating the probability of spam or non-spam based on the models. Then, based on the scores of each classification, the message may be given a total score (such as, for example, a spam/non-spam ratio). In step 214, it is determined whether the incoming voicemail message is likely spam or non-spam based on the classification of the features within the voicemail message, for example, by comparing the generated score or ratio with a predetermined threshold. If the score or ratio exceeds the threshold, the message may be considered spam and operation jumps to step 218. If the ratio is below the threshold, the message may not be considered spam, and operation continues to step 216.

In step 216, the incoming voicemail message is placed with good (non-spam) mail and operation continues to step 220. In step 218, the incoming voicemail message is placed with spam mail and operation continues to step 220. Then, in step 220, it is determined whether there is more voicemail. If there is more voicemail, the process returns to step 204. If there is no more voicemail, the process continues to step 222 and ends.

As a result of the above method an incoming voicemail may be properly stored with either good mail or spam mail based on the content of the message.

According to the above process, an incoming message may be determined to be spam or non-spam based on how well portions of the message match, or are similar to, the language patterns, audio patterns, and metafeatures.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A method of evaluating an audio message, comprising:
   storing a generic language model;
   storing a generic non-speech metafeatures model that produces a statistical likelihood that a particular non-speech metafeature will be associated with a spam message;
   extracting a non-speech metafeature associated with the audio message to yield an extracted non-speech metafeature;
   modifying the generic language model and generic non-speech metafeatures model based on actions of a user when managing spam messages, without a spam list, to generate a personal language model and a personal non-speech metafeatures model;
   identifying via a processor the audio message as the spam message or a non-spam message by comparing extracted language content of the audio message with the personal language model and comparing the extracted non-speech metafeature with the personal non-speech metafeatures model; and
   classifying the audio message as one of a spam message and a non-spam message based on a spam likelihood ratio generated by comparing the extracted language content of the audio message with a stored spam model and a stored non-spam model.

2. The method of claim 1, further comprising:
   extracting a language pattern from the audio message; and
   identifying the message as a spam message or non-spam message by comparing the extracted language pattern with language patterns in the personal language model.

3. The method of claim 1, further comprising:
   extracting an audio pattern from the audio message; and
   identifying the message as a spam message or non-spam message by comparing the extracted audio pattern with the audio patterns in the personal language model.

4. The method of claim 1 further comprising:
   generating a spam likelihood score by comparing the content of the audio message with the personal language model; and
   identifying the message as a spam message or a non-spam message based on the spam likelihood score.

5. The method of claim 1, wherein the audio message is a telephone message.

6. The method of claim 1, wherein the audio message is an e-mail with an audio file attached to it.

7. A non-transitory storage medium storing a set of program instructions executable on a device and usable to evaluate an audio message, the instructions comprising:
   storing a language model;
   storing a generic non-speech metafeatures model that produces a statistical likelihood that a particular non-speech metafeature will be associated with a spam message;
   extracting a non-speech metafeature associated with the audio message to yield an extracted non-speech metafeature;
   modifying the generic language model and generic non-speech metafeatures model based on actions of a user when managing spam messages, without a spam list, to generate a personal language model and a personal non-speech metafeatures model;
   identifying via a processor the audio message as the spam message or a non-spam message by comparing extracted language content of the audio message with the personal language model and comparing the extracted non-speech metafeature with the personal non-speech metafeatures model; and
   classifying the audio message as one of a spam message and a non-spam message based on a spam likelihood ratio generated by comparing the extracted language content of the audio message with a stored spam model and a stored non-spam model.

8. The storage medium of claim 7, the instructions further causing the processing device to:
   extract a language pattern from the audio message; and
   identify the message as a spam message or non-spam message by comparing the extracted language pattern with language patterns in the personal language model.

9. The storage medium of claim 7, the instructions further causing the processing device to:
   extract an audio pattern from the audio message; and
   identify the message as a spam message or non-spam message by comparing the extracted audio pattern with the audio patterns in the personal language model.

10. The storage medium of claim 7, the instructions further causing the processing device to:
    generate a spam likelihood score by comparing the content of the audio message with the personal language model; and
    identify the message as a spam message or a non-spam message based on the spam likelihood score.

11. A system of evaluating an audio message, comprising:
    means for storing a language model;
    means for storing a generic non-speech metafeatures model, wherein the generic non-speech metafeatures model produces a statistical likelihood that a particular non-speech metafeature will be associated with a spam message;

means for modifying the generic language model and generic non-speech metafeatures model based on actions of a user when managing spam messages, without a spam list, to generate a personal language model and a personal non-speech metafeatures model;

means for identifying via a processor the audio message as the spam message or a non-spam message by comparing extracted language content of the audio message with the personal language model and comparing the extracted non-speech metafeature with the personal non-speech metafeatures model; and means for classifying the audio message as one of a spam message and a non-spam message based on a spam likelihood ratio generated by comparing the extracted language content of the audio message with a stored spam model and a stored non-spam model.

12. The system of claim 11, wherein:

the means for storing the model comprises a controller; and the means for identifying the audio message as a spam message or a non-spam message comprises a controller.

* * * * *